United States Patent
Ueda et al.

(10) Patent No.: US 11,597,370 B2
(45) Date of Patent: Mar. 7, 2023

(54) ELECTRICAL CONTROL DEVICE FOR HEADLIGHT OF WIPER OF AUTONOMOUS VEHICLE BASED ON DRIVING STATE

(71) Applicant: TOYOTA JIDOSHA KABUSHIKI KAISHA, Toyota (JP)

(72) Inventors: Kazuhiko Ueda, Tokyo-to (JP); Ryo Masutani, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 142 days.

(21) Appl. No.: 16/831,317

(22) Filed: Mar. 26, 2020

(65) Prior Publication Data

US 2021/0300317 A1 Sep. 30, 2021

(51) Int. Cl.
| | | |
|---|---|---|
| B60W 10/30 | (2006.01) | |
| B60S 1/04 | (2006.01) | |
| B60Q 1/06 | (2006.01) | |
| B60W 60/00 | (2020.01) | |
| B60W 40/08 | (2012.01) | |

(52) U.S. Cl.
CPC ............ *B60W 10/30* (2013.01); *B60Q 1/06* (2013.01); *B60S 1/04* (2013.01); *B60W 40/08* (2013.01); *B60W 60/005* (2020.02); *B60W 2040/0818* (2013.01); *B60W 2420/42* (2013.01)

(58) Field of Classification Search
None
See application file for complete search history.

(56) References Cited

U.S. PATENT DOCUMENTS

| | | | | |
|---|---|---|---|---|
| 6,587,573 B1* | 7/2003 | Stam | .................. | G06K 9/00664 |
| | | | | 382/104 |
| 10,086,839 B2 | 10/2018 | Tellis et al. | | |
| 2015/0088358 A1* | 3/2015 | Yopp | .................. | B60W 50/082 |
| | | | | 701/23 |

(Continued)

FOREIGN PATENT DOCUMENTS

| | | |
|---|---|---|
| JP | 2017-202768 A | 11/2017 |
| JP | 2019-014408 A | 1/2019 |

OTHER PUBLICATIONS

2005 Toyota Camry Owner's Manual, Toyota Motor Coporation 2004.*

*Primary Examiner* — James J Lee
*Assistant Examiner* — David Hatch
(74) *Attorney, Agent, or Firm* — Oliff PLC

(57) ABSTRACT

An electrical device controller includes a processor, and a memory for storing a program executed by the processor. The processor controls the electrical device in multiple operation modes including an automatic mode which automatically changes the operation state of the electrical device and a stop mode which stops the electrical device, controls the electrical device in an operation mode specified with an operating member operated by an occupant when the vehicle is manually driven, controls the operation state of the electrical device in the automatic mode regardless of the operation mode specified with the operating member when the vehicle is autonomously driven, and sets the operation mode of the electrical device at least temporarily to the stop mode when the operation mode specified with the operation member is switched to the stop mode from an operation mode other than the stop mode, when the vehicle is autonomously driven.

8 Claims, 9 Drawing Sheets

(56) References Cited

U.S. PATENT DOCUMENTS

| | | | |
|---|---|---|---|
| 2015/0266409 A1* | 9/2015 | Akiyama | B60W 10/06 |
| | | | 701/49 |
| 2017/0332010 A1 | 11/2017 | Asakura et al. | |
| 2018/0126986 A1* | 5/2018 | Kim | B60W 50/087 |
| 2020/0346621 A1* | 11/2020 | Whikehart | G06K 9/00805 |
| 2021/0188281 A1* | 6/2021 | Jung | B60W 10/30 |

* cited by examiner

ELECTRICAL CONTROL DEVICE FOR HEADLIGHT OF WIPER OF AUTONOMOUS VEHICLE BASED ON DRIVING STATE

FIELD

The present disclosure relates to an electrical device controller which controls an electrical device.

BACKGROUND

Vehicles which are capable of switching the driving state between autonomous driving and manual driving have been examined. During autonomous driving, the vehicle autonomously controls at least part of steering and acceleration/deceleration. On the other hand, during manual driving, the driver fully controls steering and acceleration/deceleration.

The vehicle is also provided with various electrical devices operated by a driver. Such electrical devices include, for example, headlights and wipers to ensure visibility of the driver. Since the driver does not drive the vehicle during autonomous driving of the vehicle, from the viewpoint of driver visibility, it is not always necessary to operate these electrical devices during autonomous driving of the vehicle. However, in order to properly operate various sensors (for example, a camera) for autonomously driving the vehicle, it is necessary to operate these electrical devices even during autonomous driving. Therefore, in a vehicle capable of autonomous driving, there has been proposed a technique of automatically operating these electrical devices independently of the operation of the driver when the vehicle is in an autonomously driven state (For example, U.S. Pat. No. 10,086,839).

SUMMARY

An electronic device controller using the technique described above continues to operate the electrical device, regardless of the operation of a switch of the electrical device by an occupant in a state where the vehicle is autonomously driven. If the electrical device continues to operate without stopping, the occupant who has turned the switch off may mistakenly believe that the electrical device is faulty.

In view of the above problems, an object of the present disclosure is to provide an electrical device controller which can prevent an electrical device from being mistakenly identified as faulty when a switch of the electrical device is operated during autonomous driving of a vehicle.

The gist of the present disclosure is as follows.

According to an aspect of the present disclosure, there is provided an electrical device controller for controlling an electrical device including either a headlight or a wiper used in a vehicle which is capable of switching a driving state between autonomous driving and manual driving. The controller comprises a processor, and a memory for storing a program executed by the processor, wherein the processor is configured to control the electrical device in a plurality of operation modes including an automatic mode for automatically changing an operation state of the electrical device and a stop mode for stopping the electrical device, control the electrical device, in an operation mode specified with an operation member operated by an occupant in a state in which the vehicle is manually driven, control the operation state of the electrical device in the automatic mode, regardless of the operation mode specified with the operation member in a state in which the vehicle is autonomously driven, and set the operation mode of the electrical device at least temporarily to the stop mode when the operation mode specified with the operation member is switched to the stop mode from an operation mode other than the stop mode in a state in which the vehicle is autonomously driven.

The processor may be configured to set the operation mode of the electrical device to the stop mode for a fixed predetermined interval, when the operation mode specified with the operation member is switched to the stop mode from an operation mode other than the stop mode, in a state in which the vehicle is autonomously driven, and thereafter, set the operation mode of the electrical device to the automatic mode.

The processor may be configured to set the operation mode of the electrical device to the stop mode until it is determined that there is an abnormality in the image of the camera capturing an area in front of the vehicle, when the operation mode specified by the operation member is switched to the stop mode from an operation mode other than the stop mode, in a state in which the vehicle is autonomously driven, and thereafter, set the operation mode of the electrical device to the automatic mode.

The processor may be configured to set the operation mode of the electrical device to the automatic mode without temporarily setting the stop mode. even when the operation mode specified with the operation member is switched to the stop mode from an operation mode other than the stop mode in a state in which the vehicle is autonomously driven, in the case in which it is determined that a driver is not paying attention to an area in front of the vehicle, based on an output of a driver monitoring device which monitors a state of the driver.

The processor may be configured to set the operation mode of the electrical device at least temporarily to the stop mode, when the operation mode specified with the operation member is switched to the stop mode from an operation mode other than the stop mode in a state in which the vehicle is autonomously driven, only in the case in which an operation for approving switching of the operation mode was performed in an input device different from the operation member after switching of the operation mode with the operation member.

The electrical device may be a windshield wiper, and the processor may be configured to automatically change an operation state of the wiper, depending on an amount of rain in the automatic mode, and to stop the wiper in the stop mode.

The electrical device may be a headlight, and the processor may be configured to automatically change an operation state of the headlight depending on luminance outside the vehicle in the automatic mode, and to turn off the headlight in the stop mode.

Effects of Invention

According to the present disclosure, there is provided an electrical device controller which can suppress misidentification of a failure of the electrical device when a switch of the electrical device is operated during autonomous driving of a vehicle.

DESCRIPTION OF EMBODIMENTS

The embodiments will be described in detail below with reference to the drawings. In the following description, identical elements have been assigned the same reference signs.

First Embodiment

«Structure of Vehicle Control System»

Figure 1:
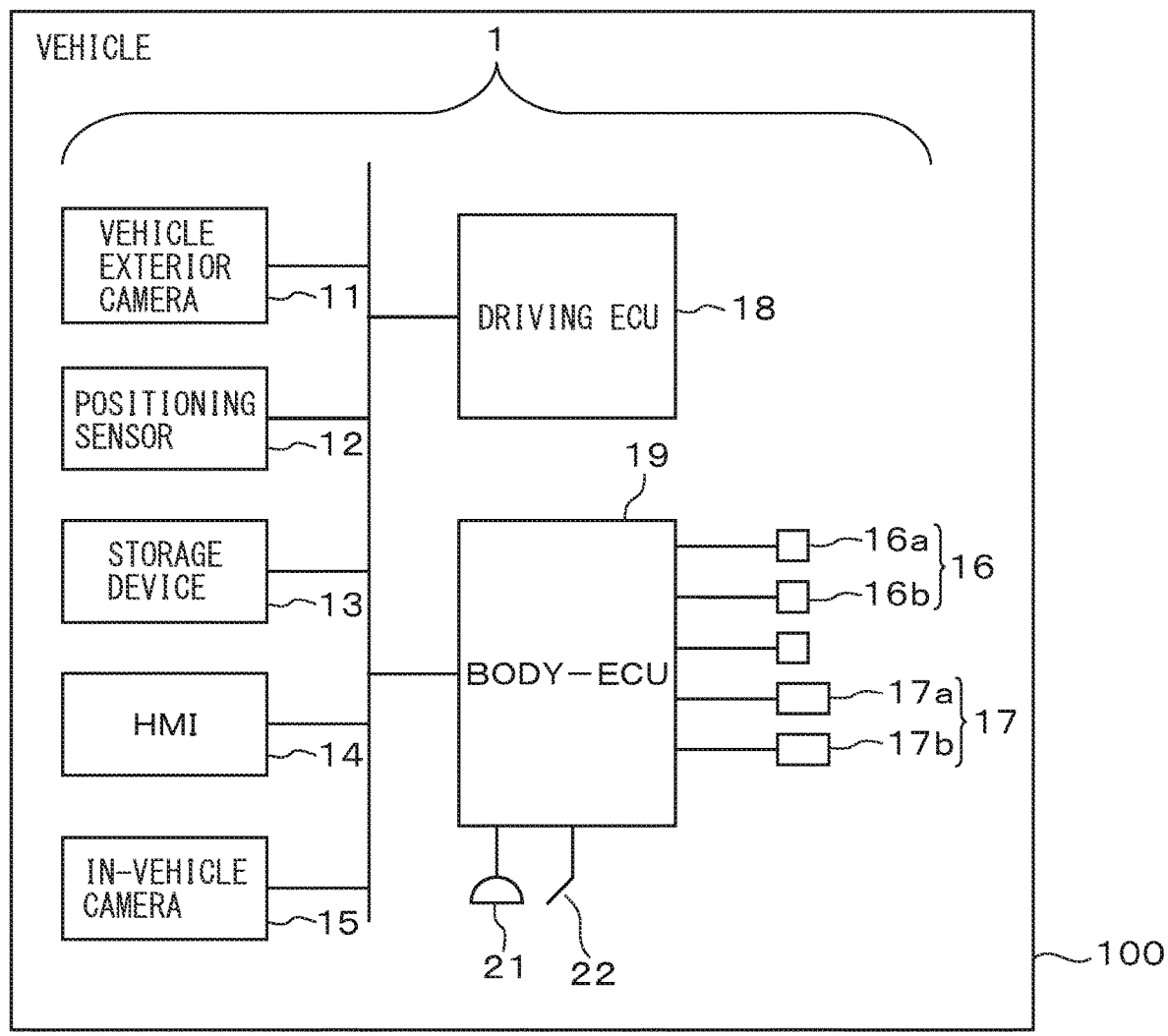
FIG. 1 is a block diagram schematically showing a vehicle control system in which an electrical device controller according to a first embodiment is mounted.

FIG. 1 is a block diagram schematically showing a vehicle control system in which an electrical device controller according to a first embodiment is mounted. The vehicle control system 1 is mounted on a vehicle 100 and controls the vehicle 100. In the present embodiment, the vehicle control system 1 includes a vehicle exterior camera 11, a positioning sensor 12, a storage device 13, a human-machine interface (hereinafter referred to as "HMI") 14, an in-vehicle camera 15, at least one sensor 16, an operation switch 17, a driving control electronic control unit (hereinafter referred to as "driving ECU") 18, and a vehicle body control electronic control unit (hereinafter referred to as "BODY-ECU") 19.

The vehicle exterior camera 11, the positioning sensor 12, the storage device 13, the HMI 14, the in-vehicle camera 15, the driving ECU 18, and the BODY-ECU 19 are communicably connected via an in-vehicle network. The in-vehicle network is a network which conforms to a standard such as CAN (Controller Area Network). The sensor 16 and the operation switch 17 are connected to the BODY-ECU 19 via signal lines. In addition, the BODY-ECU 19 is connected to electrical devices, including headlights 21 and wipers 22, via signal lines.

The vehicle control system 1 may further include an object detection sensor for detecting objects around the vehicle 100. The object detection sensor includes, for example, a LIDAR sensor or radar. The vehicle control system 1 may further include a wireless communication device for communicating with external devices.

The vehicle exterior camera 11 is a device for capturing the surroundings of the vehicle. The vehicle exterior camera 11 has a two-dimensional detector (CCD, C-MOS, etc.) constituted by an array of photoelectric conversion elements having sensitivity to visible light, and an imaging optical system which forms an image of the region to be imaged on the two-dimensional detector. In the present embodiment, the vehicle exterior camera 11 is mounted in, for example, the interior of the vehicle 100 so as to face toward the front of the vehicle 100. The vehicle exterior camera 11 captures a front area of the vehicle 100 at predetermined imaging cycles (for example, $1/30$ sec to $1/10$ sec), and generates images in which the front area is captured. Each time an image is generated, the vehicle exterior camera 11 outputs the generated image to the driving ECU 18. The vehicle 100 may be provided with a plurality of vehicle exterior cameras having different capturing directions or focal lengths.

The positioning sensor 12 localizes (measures the position of) the vehicle 100. The positioning sensor 12 is, for example, a GPS (Global Positioning System) receiver. The GPS receiver receives GPS signals from a plurality of GPS satellites and localizes the vehicle 100 based on the received GPS signals. The positioning sensor 12 outputs the localization results of the vehicle 100 to the driving ECU 18 at predetermined intervals via the in-vehicle network. The positioning sensor 12 may be a receiver based on another satellite positioning system as long as it can localize the vehicle 100.

The storage device 13 includes, for example, a hard disk device or a nonvolatile semiconductor memory. The storage device 13 stores map information. The map information includes, for each predetermined section of the road, the position of the section, information representing road markings (for example, lane marking lines or stop lines), and information representing road signs. The storage device 13 reads the map information in accordance with a map information read request from the driving ECU 18, and transmits the map information to the driving ECU 18 via the in-vehicle network.

The HMI 14 notifies the driver of the vehicle 100 of notification information received from the driving ECU 18 or the BODY-ECU 19. Therefore, the HMI 14 functions as a notification device for notifying the driver of information. Specifically, the HMI 14 includes a display device such as a liquid crystal display, a meter such as a speedometer, a warning lamp, and a speaker. The HMI 14 receives an input from an occupant and transmits the received input to the driving ECU 18 or the BODY-ECU 19. Therefore, the HMI 14 functions as an input device for receiving an input from an occupant or a driver. In other words, the HMI 14 functions as an input device different from the operation switch 17. Specifically, the HMI 14 has a touch panel, a switch different from the operation switch 17, a button, and/or a remote control. The HMI 14 is provided, for example, on the instrument panel.

The in-vehicle camera 15 is a device for capturing the interior of the vehicle. The in-vehicle camera 15 has a two-dimensional detector and an imaging optical system, similarly to the vehicle exterior camera 11. In the present embodiment, the in-vehicle camera 15 is mounted in the vehicle so as to face the occupant of the vehicle 100, particularly the driver. Therefore, the in-vehicle camera 15 functions as a driver monitoring device for monitoring the state of the driver. The in-vehicle camera 15 captures images of the interior of the vehicle at a predetermined capturing cycle and generates images of the interior of the vehicle. Each time an image is generated, the in-vehicle camera 15 outputs the generated image to the driving ECU 18 and the BODY-ECU 19.

The sensor 16 measures physical parameters representative of the vehicle exterior environment. In particular, in the present embodiment, the sensor 16 measures physical parameters related to the degree to which the vehicle exterior camera 11 and driver can view the surroundings of the vehicle 100. For example, the sensor 16 includes an illuminance sensor 16a for measuring the brightness (illuminance) around the vehicle 100 and a rain sensor 16b for measuring the amount of rain around the vehicle 100. Each time a measured value of a physical parameter is obtained, the sensor 16 outputs the measured value to the BODY-ECU 19.

The operation switch 17 is an example of an operation member operated by an occupant. The operation switch 17 is used by the driver to specify the operation mode applied to headlights 21 and the wipers 22. In the present embodiment, the operation switch 17 includes a light operation switch 17a for operating the headlights 21 and a wiper operation switch 17b for operating the wipers 22. The light operation switch 17a is provided, for example, on the rear side of the steering wheel and on the right side as viewed from the driver. The wiper operation switch 17b is provided, for example, on the rear side of the steering wheel and on the left side as viewed from the driver. The operation switches 17a and 17b are provided with a plurality of switch positions for specifying different operation modes.

Figure 2:
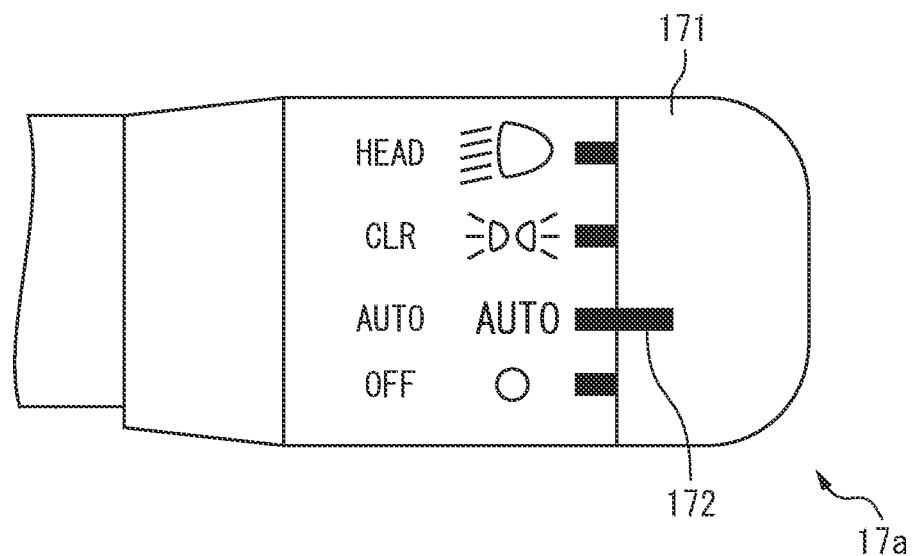
FIG. 2 is a view for explaining switch positions of a light operation switch.

FIG. 2 is a view for explaining the switch positions of the light operation switch 17a. For example, the light operation switch 17a is provided, as switch positions, with a HEAD position, a CLR position, an AUTO position, and an OFF position.

The HEAD position is a switch position for specifying, as an operation mode, a full lighting mode for forcibly turning on the headlights 21 and the clearance lamps. The CLR position is a switch position for specifying, as an operation mode, a partial lighting mode for lighting the clearance lamps without turning on the headlights 21. The AUTO position is a switch position for specifying, as the operation mode, an automatic mode in which the operation states (turning on or off) of the headlights and the clearance lamps are automatically controlled. The OFF position is a switch position for specifying, as an operation mode, a stop mode in which both the headlights 21 and the tail lamps are turned off.

As shown in FIG. 2, the light operation switch 17a has, at its tip, an indicator member 171 rotatable about the axis of the light operation switch 17a. When the driver rotates the indicator member 171 to set an instruction mark 172 to an arbitrary switch position, the light operation switch 17a outputs an operation signal representing the operation mode corresponding to the switch position.

The light operation switch 17a may be capable of setting the light distribution direction (e.g., up and down) of the headlights 21. The light operation switch 17a may be capable of setting the application of automatic light distribution control to the headlights 21. Further, as long as the specified operation mode can be changed therewith, another operation member such as a touch panel may be used instead of the light operation switch 17a.

Figure 3:
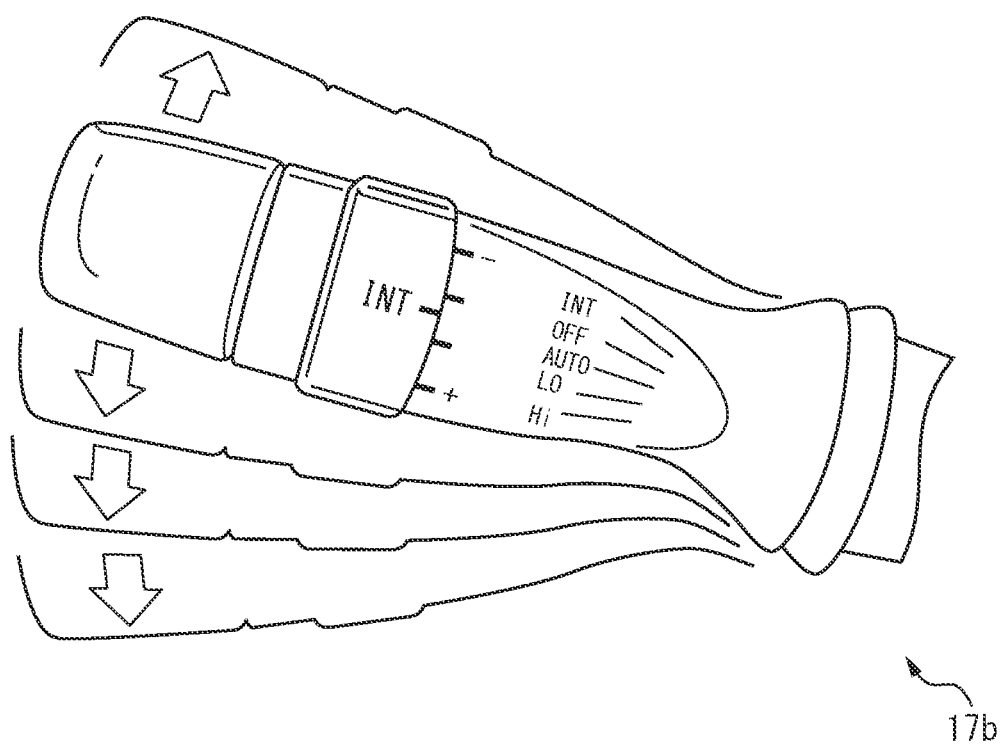
FIG. 3 is a view for explaining switch positions of a wiper operation switch.

FIG. 3 is an explanatory view of the switch positions of the wiper operation switch 17b. The wiper operation switch 17b is provided with, for example, an INT position, an OFF position, an AUTO position, a Lo position, and a Hi position, from top to bottom, as switch positions.

The AUTO position is a switch position for specifying, as an operation mode, an automatic mode in which the operation state of the wipers 22 is automatically controlled. The Hi position is a switch position for specifying, as an operation mode, a high-speed mode in which the wipers 22 operate (hereinafter simply referred to as "operating") to wipe the windshield at a relatively high speed. The Lo position is a switch position for specifying, as an operation mode, a low speed mode in which the wipers 22 operate at a relatively low speed. The INT position is a switch position for specifying, as an operation mode, an intermittent mode in which the wipers 22 operate intermittently. The OFF position is a switch position for specifying, as an operation mode, a stop mode in which the wipers 22 are stopped. Further, the wiper operation switch 17b may be capable of adjusting the operation interval of the wipers 22 when the switch position is in the INT position.

When the driver moves the wiper operation switch 17b up or down, the switch position of the wiper operation switch 17b changes. Whenever the switch position is changed, the wiper operation switch 17b outputs an operation signal representing the operation mode corresponding to the switch position.

As long as the specified operation mode can be changed therewith, another operation member such as a touch panel may be used instead of the wiper operation switch 17b.

The driving ECU 18 executes control regarding the driving of the vehicle 100. The driving ECU 18 includes, for example, one or more processors, a memory, and a communication interface. The driving ECU 18 controls actuators related to the driving of the vehicle 100, based on signals received from the vehicle exterior camera 11, the positioning sensor 12, the storage device 13, and the like. Specifically, the driving ECU 18 controls, for example, actuators for controlling the steering, acceleration, and braking of the vehicle 100.

The BODY-ECU 19 is an example of an electrical device controller. The BODY-ECU 19 controls electrical devices such as the headlights 21 and the wipers 22.

Figure 4:
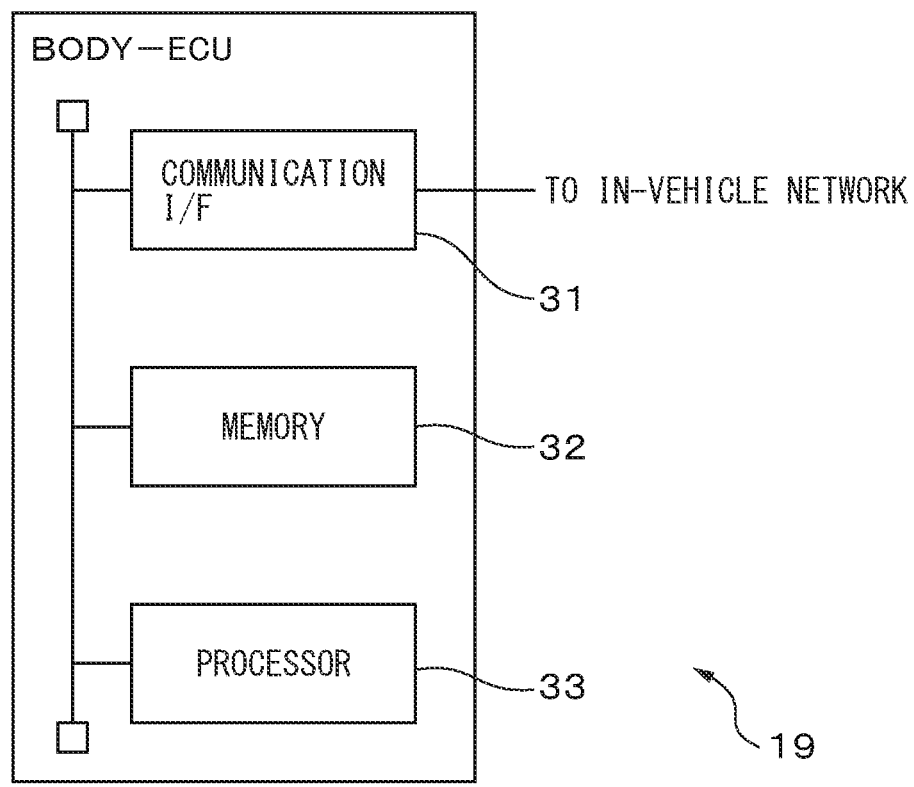
FIG. 4 is a diagram showing a hardware configuration of a BODY-ECU, which is an embodiment of an electrical device controller.

FIG. 4 is a hardware configuration diagram of the BODY-ECU 19, which is an embodiment of the electrical device controller. The BODY-ECU 19 includes a communication interface 31, a memory 32, and a processor 33. The communication interface 31, the memory 32, and the processor 33 may be separate circuits or may be configured as a single integrated circuit.

The communication interface 31 includes a communication interface circuit and a device interface circuit. The communication interface circuit is a circuit for connecting the BODY-ECU 19 to the in-vehicle network. The device interface circuit is a circuit for receiving a signal from the sensor 16 or the operation switch 17 and outputting a control signal to the headlights 21 and the wipers 22.

When the communication interface 31 receives a signal representing the current driving state from the driving ECU 18 via the in-vehicle network, it transmits the signal to the processor 33. In addition, each time the communication interface 31 receives a signal representing a measurement value such as illuminance or amount of rain from the sensor 16, it transmits the signal to the processor 33. Furthermore, each time the communication interface 31 receives a signal representative of an operation mode specified by operation switch 17, it sends the signal to the processor 33.

The memory 32 is a storage device for storing data. The memory 32 includes, for example, a volatile semiconductor memory and a nonvolatile semiconductor memory. The memory 32 stores a program for electrical device control processing executed by the processor 33 of the BODY-ECU 19, various data used in the electrical device control processing, measured values of physical parameters, and the like.

The processor 33 includes one or more CPUs (Central Processing Unit) and their peripheral circuits. The processor 33 may further include other arithmetic circuits, such as logical or numerical operation units. The processor 33 executes electrical device control processing to control the headlights 21 and the wipers 22.

The headlights 21 are lights that illuminate the area in front of the vehicle 100, and are provided on the front of the vehicle 100. The headlights 21 may be configured to switch light distribution direction (e.g., up and down).

The wipers 22 wipe the windshield of the vehicle 100, and are provided on the windshield of the vehicle 100. The wipers 22 may be a device for wiping the rear window of the vehicle 100.

«Vehicle Driving Control»

In the present embodiment, the driving ECU 18 switches the driving state of the vehicle 100 between autonomous driving and manual driving. For example, the driving ECU 18 switches the driving state from the manual driving state to the autonomous driving state when the vehicle 100 enters the section, where the autonomous driving is possible, represented in the map information. Conversely, the driving ECU 18 switches the driving state from autonomous driving to manual driving when the vehicle 100 leaves the section where the autonomous driving is possible. The driving ECU 18 determines whether or not the vehicle 100 is located in a section where autonomous driving is possible, based on the position of the vehicle 100 estimated from the positioning information or the like of the positioning sensor 12 and the map information.

The driving ECU 18 controls actuators for controlling steering, acceleration, and braking of the vehicle 100 in accordance with inputs from operating devices (not shown) of the vehicle 100, when the vehicle 100 is manually driven. Specifically, the driving ECU 18 controls an actuator for controlling the steering of the vehicle 100 in accordance with an input from the steering wheel. The driving ECU 18 also controls an actuator (e.g., an internal combustion engine or motor) for controlling the acceleration of the vehicle 100 in accordance with an input from the accelerator pedal. Further, the driving ECU 18 controls an actuator (e.g., a brake) for controlling the braking of the vehicle 100 in accordance with an input from the brake pedal.

The driving ECU 18 controls actuators for controlling the steering, acceleration, and braking of the vehicle 100 regardless of input from operation devices of the vehicle 100, when the vehicle 100 is autonomously driven. The driving ECU 18 controls these actuators to autonomously drive the vehicle 100, for example, along a driving route set by a navigation system (not shown). For example, the driving ECU autonomously drives the vehicle 100 in accordance with the following procedure.

First, the driving ECU 18 detects objects, road markings, and the like, around the vehicle 100, from a series of time-series images obtained by the vehicle exterior camera 11. Then, the driving ECU 18 sets the driving path of the vehicle 100 in the driving route so that the detected objects and the vehicle 100 do not collide with each other and so as to comply with the road markings. When setting the driving path, the driving ECU 18 also sets a target time at which the vehicle 100 reaches each point of the driving path.

Thereafter, the driving ECU 18 determines a control amounts such as an acceleration amount, a steering amount, and a braking amount, so that the vehicle 100 drives along the driving path. The driving ECU 18 controls the actuators for controlling the steering, acceleration, and braking of the vehicle 100 in accordance with the determined control amount.

When autonomous driving is switched to manual driving or when manual driving is switched to autonomous driving, the driving ECU 18 notifies the driver via the HMI 14 that such a switching has been performed. At this time, the driving ECU 18 transmits to the BODY-ECU 19 a signal indicating the type of the driving state (autonomous or manual) to be applied after the switching.

«Control of Electrical Device»

Electrical devices such as the headlights 21 and the wipers 22 are controlled by the BODY-ECU 19. The processor 33 of the BODY-ECU 19 changes the control mode of the headlights 21 and the wipers 22 in accordance with the driving state of the vehicle 100.

The processor 33 controls headlights 21 and wipers 22 in the operation mode specified by operation switch 17, when vehicle 100 is manually driven. For example, when the operation switch 17 is set to the OFF position, the operation mode specified by the operation switch 17 is the stop mode. In this case, the processor 33 operates the headlights 21 or the wipers 22 in the stop mode. For example, when the operation switch 17 is set to the AUTO position, the operation mode specified by the operation switch 17 is the automatic mode. In this case, processor 33 operates headlights 21 or wipers 22 in the automatic mode.

When the operation mode of the headlights 21 is the automatic mode, the processor 33 automatically changes the operation state (turning on or off) of the headlights and the clearance lamps, in accordance with the ambient illuminance of the vehicle 100 measured by the illuminance sensor 16a. Specifically, the processor 33 turns on the headlights 21 and the clearance lamps when the illuminance measured by the illuminance sensor 16a is lower than a predetermined reference value. Conversely, the processor 33 turns off the headlights 21 and the clearance lamps when the illuminance measured by the illuminance sensor 16a is higher than the predetermined reference value.

When the operation mode of the wipers 22 is the automatic mode, the processor 33 automatically changes the operation state of the wipers 22 in accordance with the amount of rain measured by the rain sensor. In particular, the processor 33 automatically determines whether to operate the wipers 22 and automatically adjusts the operating speed of the wipers 22. Specifically, the processor 33 operates the wipers 22 in the high-speed mode when the amount of rain measured by the rain sensor is greater than the first reference amount. When the amount of rain measured by the rain sensor is less than the first reference amount and greater than the second reference amount, the processor 33 operates the wipers 22 in the low-speed mode. In addition, the processor 33 operates the wipers 22 in an intermittent mode when the amount of rain measured by the rain sensor is less than the second reference amount and greater than zero. Further, the processor 33 stops the wipers 22 when the amount of rain measured by the rain sensor is zero.

When the vehicle 100 is autonomously driven, the processor 33 basically controls the electrical devices (headlights 21 and wipers 22) in the automatic mode, regardless of the operation mode specified by the operation switch 17.

However, even in this case, when the operation mode specified by the operation switch 17 is switched to the stop mode from an operation mode other than the stop mode, the processor 33 sets the operation mode of the electrical device at least temporarily to the stop mode. Further, in the present embodiment, the processor 33 continues to set the operation mode of the electrical device to the stop mode for a predetermined period of time after setting the operation mode of the electrical device to the stop mode. After the certain period of time has elapsed, the processor 33 returns the operation mode of the electrical device to the automatic mode even if the operation mode specified by the operation switch 17 is maintained in the stop mode.

Specifically, when the operation mode specified by the light operation switch 17a is the full lighting mode, the partial lighting mode, or the automatic mode, while the vehicle 100 is in the autonomous driving state, the processor 33 operates the headlights 21 in the automatic mode. Therefore, the processor 33 turns on the headlights 21 and the clearance lamps when the illuminance measured by the illuminance sensor 16a is lower than the reference value. In this state, when the operation mode specified by the light operation switch 17a is switched to the stop mode, the processor 33 turns off the headlights 21 and the clearance lamps. Conversely, when the headlights 21 are operated in the automatic mode, the processor 33 turns off the headlights 21 and the clearance lamps when the illuminance measured by the illuminance sensor 16a is equal to or greater than the reference value. In this state, when the operation mode specified by the light operation switch 17a is switched to the stop mode, the processor 33 keeps the headlights 21 and the clearance lamps off.

In the present embodiment, the processor 33 keeps the operation mode of the headlights 21 set to the stop mode for a predetermined reference time (e.g., 0.5 to 2 seconds.) after the lights have been turned off. Thus, processor 33 keeps the headlights 21 and clearance lamps off.

After the reference time has elapsed, the processor 33 returns the operation mode of the headlights 21 to the automatic mode, even if the operation mode specified by the light operation switch 17a is kept in the stop mode. Therefore, when the illuminance measured by the illuminance sensor 16a is lower than the reference value, the processor 33 turns on the headlights 21 and the clearance lamps again. Conversely, when the illuminance measured by the illuminance sensor 16a is equal to or greater than the reference value, the processor 33 keeps the headlights 21 and the clearance lamps off.

Similarly, when the operation mode specified by the wiper operation switch 17b is the high-speed mode, the low-speed mode, the intermittent mode, or the automatic mode while the vehicle 100 is in the autonomous driving state, the processor 33 operates the wipers 22 in the automatic mode. Thus, the processor 33 activates the wipers 22 when the amount of rain measured by the rain sensor 16b is not zero. In this state, when the operation mode specified by the wiper operation switch 17b is switched to the stop mode, the processor 33 stops the wipers 22. Conversely, the processor 33 stops the wipers 22 when the amount of rain measured by the rain sensor 16b is zero. In this state, when the operation mode specified by the wiper operation switch 17b is switched to the stop mode, the processor 33 keeps the wipers 22 stopped.

In the present embodiment, the processor 33 keeps the operation mode of the wipers 22 set to the stop mode for a predetermined reference time (e.g., 0.5 to 2 seconds.) after the wipers 22 have been stopped. Thus, the processor 33 keeps the wipers 22 stopped.

After the reference time has elapsed, the processor 33 returns the operation mode of the wipers 22 to the automatic mode, even if the operation mode specified by the wiper operation switch 17b is kept in the stop mode. Thus, when the amount of rain measured by the rain sensor 16b is not zero, the processor 33 again operates the wipers 22 intermittently or continuously. Conversely, when the amount of rain measured by the rain sensor 16b is zero, the processor 33 keeps the wipers 22 stopped.

The processor 33 may control the headlights 21 not in the automatic mode but in the full lighting mode, when the operation mode specified by the light operation switch 17a is the full lighting mode even when the vehicle 100 is in the autonomous driving state. Further, the processor 33 may control the wipers 22 in the high-speed mode or the low-speed mode instead of the automatic mode, when the operation mode specified by the wiper operation switch 17b is the high-speed mode or the low-speed mode, even if the vehicle 100 is in the autonomous driving state.

«Flowchart»

Figure 5:
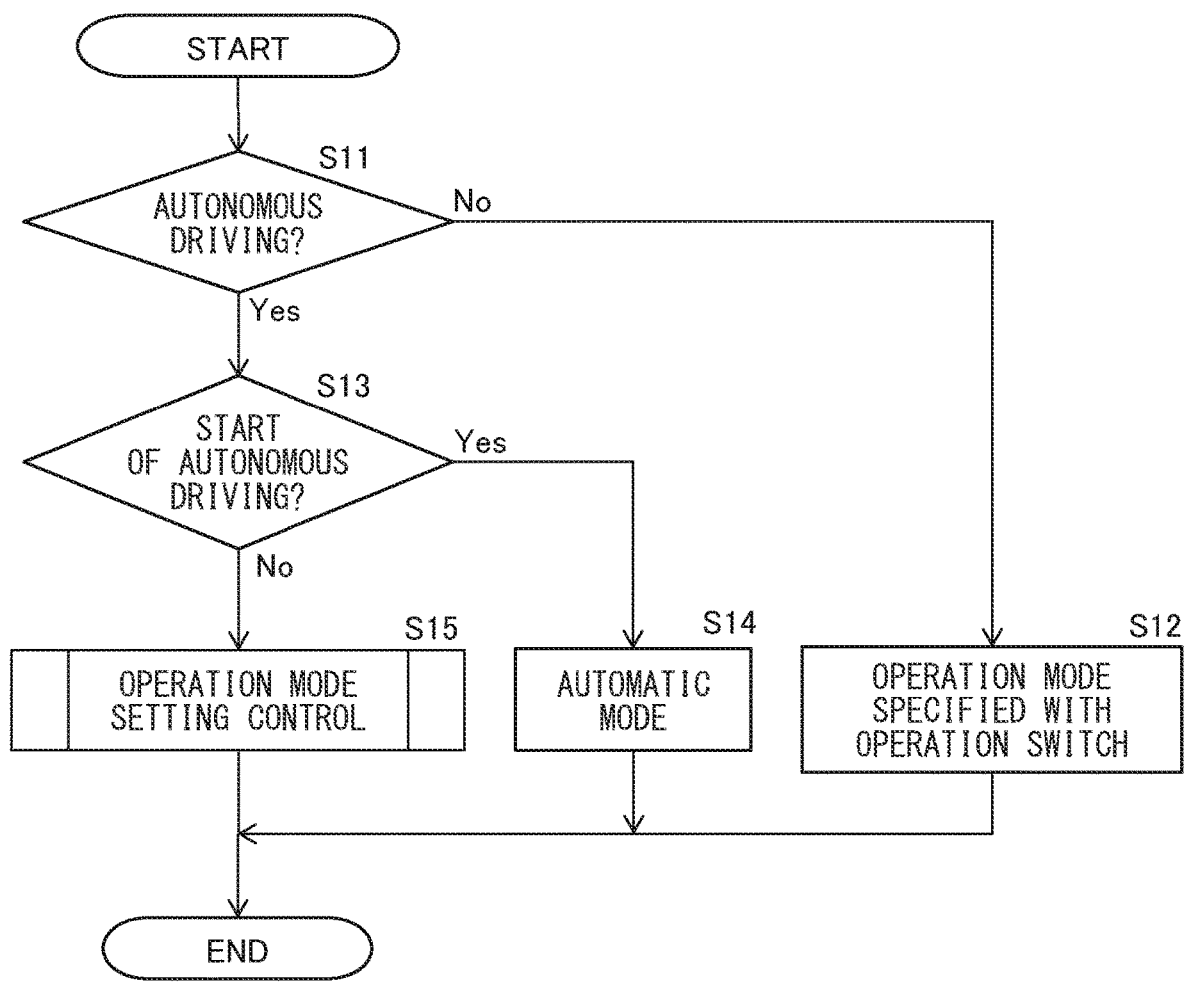
FIG. 5 is a flowchart of an operation mode setting process of the electrical device.

FIG. 5 is a flowchart of the operation mode setting process of the electrical device. The processor 33 executes the operation mode setting process at predetermined time intervals.

As shown in FIG. 5, the processor 33 determines whether the vehicle 100 is autonomously driven (step S11). The processor 33 determines whether or not autonomous driving is being performed, based on a signal indicating the type of the driving state of the vehicle 100 transmitted from the driving ECU 18. If it is determined in step S11 that the vehicle 100 is not being autonomously driven (step S11—No), the processor 33 operates the electrical device in the operation mode specified by the operation switch 17 (step S12).

On the other hand, if it is determined in step S11 that the vehicle 100 is in the autonomous driving state (step S11—Yes), the processor 33 determines whether the autonomous driving of the vehicle 100 has started in this process (step S13). The processor 33 determines that the autonomous driving of the vehicle 100 has started in this process, when it is determined that the vehicle 100 is in the manual driving state during the previous operation mode setting process and that the vehicle 100 is in the autonomous driving state during the current operation mode setting process. If it is determined in step S13 that the autonomous driving of the vehicle 100 has started in this process (step S13—Yes), the processor 33 sets the operation mode of the electrical device to the automatic mode (step S14). On the other hand, if the vehicle 100 has previously been driving autonomously, it is not determined in step S13 that the autonomous driving of the vehicle 100 has started in this process (step S13—No). In this case, the processor 33 executes the operation mode setting process during autonomous driving shown in FIG. 6 (step S15).

Figure 6:
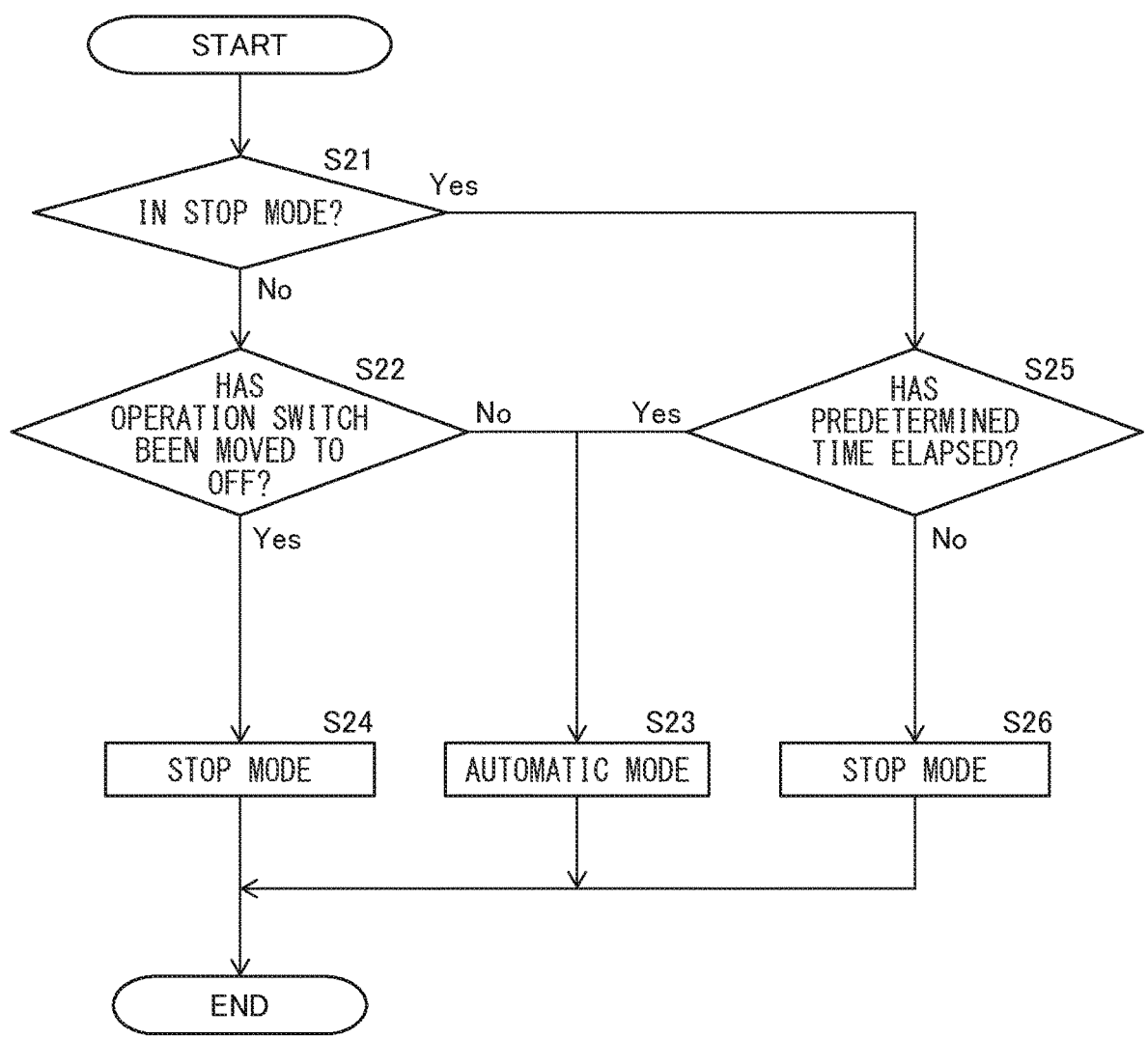
FIG. 6 is a flowchart of an operation mode setting process during autonomous driving executed by the controller according to the first embodiment.

FIG. 6 is a flowchart of an operation mode setting process during autonomous driving executed by the controller according to the first embodiment. The operation mode setting process during autonomous driving of FIG. 6 is executed in step S13 of FIG. 5.

As shown in FIG. 6, the processor 33 first determines whether or not the current operation mode of the electrical device is the stop mode (step S21). Immediately after the vehicle 100 starts autonomous driving, the operation mode of the electrical device is set to the automatic mode in step S14 in FIG. 5. Therefore, at this time, the processor 33 determines that the current operation mode of the electrical device is not the stop mode (step S21—No), and in this case, the processor 33 determines whether or not the operation switch 17 has been moved to the OFF position in this process (step S22). If it is determined in step S22 that the operation switch 17 has not been moved to the OFF position in this process (step S22—No), the processor 33 sets the operation mode of the electrical device to the automatic mode (step S23). On the other hand, if it is determined in step S22 that the operation switch 17 has been moved to the OFF position in this process (step S22—Yes), the processor 33 sets the operation mode of the electrical device to the stop mode (step S24).

When the operation mode of the electrical device is set to the stop mode, in the next operation mode setting process, in step S21, the processor 33 determines that the current operation mode of the electrical device is the stop mode (step S21—Yes). In this case, the processor 33 determines whether or not a predetermined reference time has elapsed since the start of the stop mode (step S25). If it is determined in step S25 that the reference time has not elapsed (step S24—No), the processor 33 keeps the operation mode of the electrical device in the stop mode (step S26). Conversely, if it is determined in step S25 that the reference time has elapsed (step S24—Yes), the processor 33 sets the operation mode of the electrical device to the automatic mode.

«Effects»

As described above, in the state in which the vehicle 100 is autonomously driven, the electrical device is basically operated in the automatic mode. In such a case as well, the driver may change the operation switch 17 to the OFF position from a position other than the OFF position. In this case, the operation mode specified by the operation switch 17 is switched to the stop mode from the operation mode other than the stop mode. In such a case, if the operation mode of the electrical device is continuously set to the automatic mode and the electrical device remains in operation, the driver may misidentify that the electrical device has failed.

Conversely, in the electrical device controller according to the present embodiment, even in a state in which the vehicle 100 is autonomously driven, when the operation mode specified by the operation switch is switched to the stop mode, the operation mode of the electrical device is temporarily set to the stop mode. In other words, in the present embodiment, the intention of the driver is respected, and the electrical device operates as operated by the driver. As a result, the driver is prevented from mistakenly identifying that the electrical device has failed.

Second Embodiment

Next, an electrical device controller according to a second embodiment will be described with reference to FIG. 7. The differences from the electrical device controller according to the first embodiment will be mainly described below.

As described above, the driving ECU 18 controls actuators for controlling steering, acceleration, and braking of the vehicle 100 in a state where the vehicle 100 is autonomously driven. At this time, the driving ECU 18 controls the actuators based on the output signals from the vehicle exterior camera 11 and the positioning sensor 12 and the map information stored in the storage device 13. Therefore, the driving ECU 18 cannot appropriately control the actuators unless an appropriate image is outputted from the vehicle exterior camera 11. As a result, the driving ECU 18 cannot autonomously drive the vehicle 100.

Therefore, the driving ECU 18 determines whether or not the image output from the vehicle exterior camera 11 is abnormal. For example, when the area corresponding to the road surface is dark in the image output from the vehicle exterior camera 11, the driving ECU 18 determines that an abnormality has occurred in the image. Specifically, the driving ECU 18 determines that an abnormality has occurred in the image when the maximum luminance value of the region corresponding to the road surface in the image output from the vehicle exterior camera 11 is equal to or less than a predetermined value. Alternatively, the driving ECU 18 determines that an abnormality has occurred in the image when the degree of raindrop appearance in the region corresponding to the road surface is high in the images output from the vehicle exterior camera 11. The degree of raindrop appearance is an index indicating the degree to which raindrops on the windshield are appeared in a specific region of the image. An index representing the degree of raindrop appearance includes, for example, a texture degree. Therefore, when the high frequency component or the edge component contained in a specific region of the image is less than a predetermined amount, the driving ECU 18 determines that the degree of raindrop appearance is high, and thus determines that an abnormality has occurred in the image.

When the driving ECU 18 determines that an abnormality has occurred in the image output from the vehicle exterior camera 11, the driving ECU 18 transmits a signal indicating that an abnormality has occurred in the image to the BODY-ECU 19. If the driving ECU 18 determines that an abnormality has occurred in the image output from the vehicle exterior camera 11, the driving state of the vehicle 100 may be switched from autonomous driving to manual driving.

As described above, when the operation mode specified by the operation switch 17 is switched to the stop mode in a state in which the vehicle 100 is autonomously driven, the processor 33 sets the operation mode of the electrical device to the stop mode. Thus, when the operation mode of the electrical device is set to the stop mode, the processor 33 stops the electrical device. Specifically, processor 33 turns off the headlights 21 or stops the wipers 22. When the headlights 21 are turned off, the image output from the vehicle exterior camera 11 becomes dark, depending on the situation. When the wipers 22 are stopped, the degree of raindrop appearance on a specific region of the image increases, depending on the situation. In this case, the driving ECU 18 determines that an abnormality has occurred in the image output from the vehicle exterior camera 11.

Therefore, in the second embodiment, when the operation mode specified by the operation switch 17 is switched to the stop mode, the processor 33 maintains the operation mode of the electrical device in the stop mode until it is determined that there is an abnormality in the image of the vehicle exterior camera 11. If it is determined that an abnormality has occurred in the image of the vehicle exterior camera 11, the processor 33 returns the operation mode of the electrical device to the automatic mode even if the operation mode specified by the operation switch 17 is kept in the stop mode.

Figure 7:
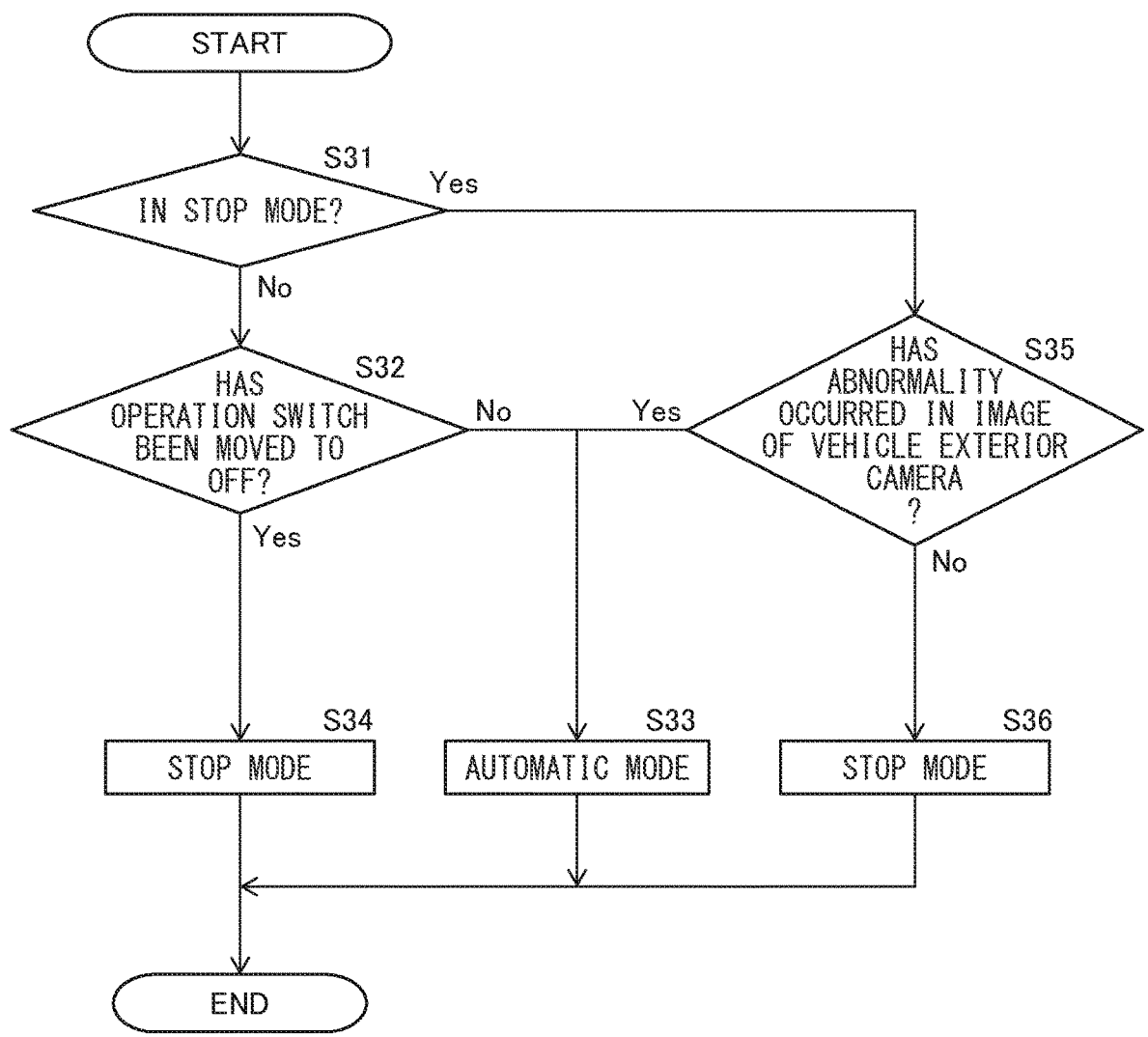
FIG. 7 is a flowchart of an operation mode setting process during autonomous driving executed by the controller according to a second embodiment.

FIG. 7 is a flowchart of the operation mode setting process during autonomous driving executed by the controller according to the second embodiment. The operation mode setting process during the autonomous driving of FIG. 7 is executed in step S13 of FIG. 5. Since steps S31 to S34 and S36 of FIG. 7 correspond to steps S21 to S24 and S26 of FIG. 6, respectively, descriptions thereof have been omitted.

When it is determined in step S31 that the current operation mode of the electrical device is the stop mode (step S31—Yes), the processor 33 determines whether or not there is an abnormality in the image of the vehicle exterior camera 11 (step S35). Abnormality in the image of the vehicle exterior camera 11 is determined based on whether a signal indicating that an abnormality has occurred in the image is transmitted from the driving ECU 18. If it is determined in step S35 that no abnormalities have occurred in the image of the vehicle exterior camera 11 (step S35—No), the processor 33 keeps the operation mode of the electrical device in the stop mode (step S36). Conversely, if it is determined in step S35 that an abnormality has occurred in the image of the vehicle exterior camera 11 (step S35—Yes), the processor 33 sets the operation mode of the electrical device to the automatic mode (step S33).

According to the controller according to the present embodiment, the operation mode of the electrical device is kept in the stop mode until an abnormality occurs in the image of the vehicle exterior camera 11. As a result, the electrical device can be operated in a manner that respects the intention of the driver to the greatest degree possible.

Third Embodiment

Next, an electrical device controller according to a third embodiment will be described with reference to FIG. 8. The differences from the electrical device controller according to the first embodiment will be mainly described below.

In the present embodiment, the BODY-ECU 19 determines, based on the image output by the in-vehicle camera 15, whether or not the driver is paying attention toward the front of the vehicle 100. For example, the BODY-ECU 19 determines whether or not the driver is paying attention toward the front, based on the direction of the driver's eyes. More specifically, the BODY-ECU 19 recognizes the direction of the face of the driver and the position of the eyes in the face by an arbitrary recognition method based on, for example, the image output by the in-vehicle camera 15. The BODY-ECU 19 then detects the orientation of the driver's eyes based on the recognized orientation of the driver's face and the position of the eyes in the face. When the detected eye direction of the driver is the forward direction of the vehicle 100, the BODY-ECU 19 determines that the driver is paying attention toward the front. Conversely, when the detected eye direction of the driver is not the forward direction of the vehicle 100, the BODY-ECU 19 determines that the driver is not paying attention toward the front.

If the operation switch 17 is operated when the driver is not paying attention toward the front, there is a high possibility that the operation of the operation switch 17 by the driver is an erroneous operation. In addition, when the driver is not paying attention toward the front, the driver does not notice if the operation state of the electrical device does not change in accordance with the operation of the operation switch 17.

Therefore, in the present embodiment, when it is determined that the driver is not paying attention toward the front of the vehicle, the processor 33 does not set the operation mode of the electrical device to the stop mode even if the operation mode input by the operation switch 17 is switched to the stop mode while the vehicle 100 is in the autonomous driving state. Thus, in this case, the processor 33 keeps the operation mode of the electrical device in the automatic mode.

Figure 8:
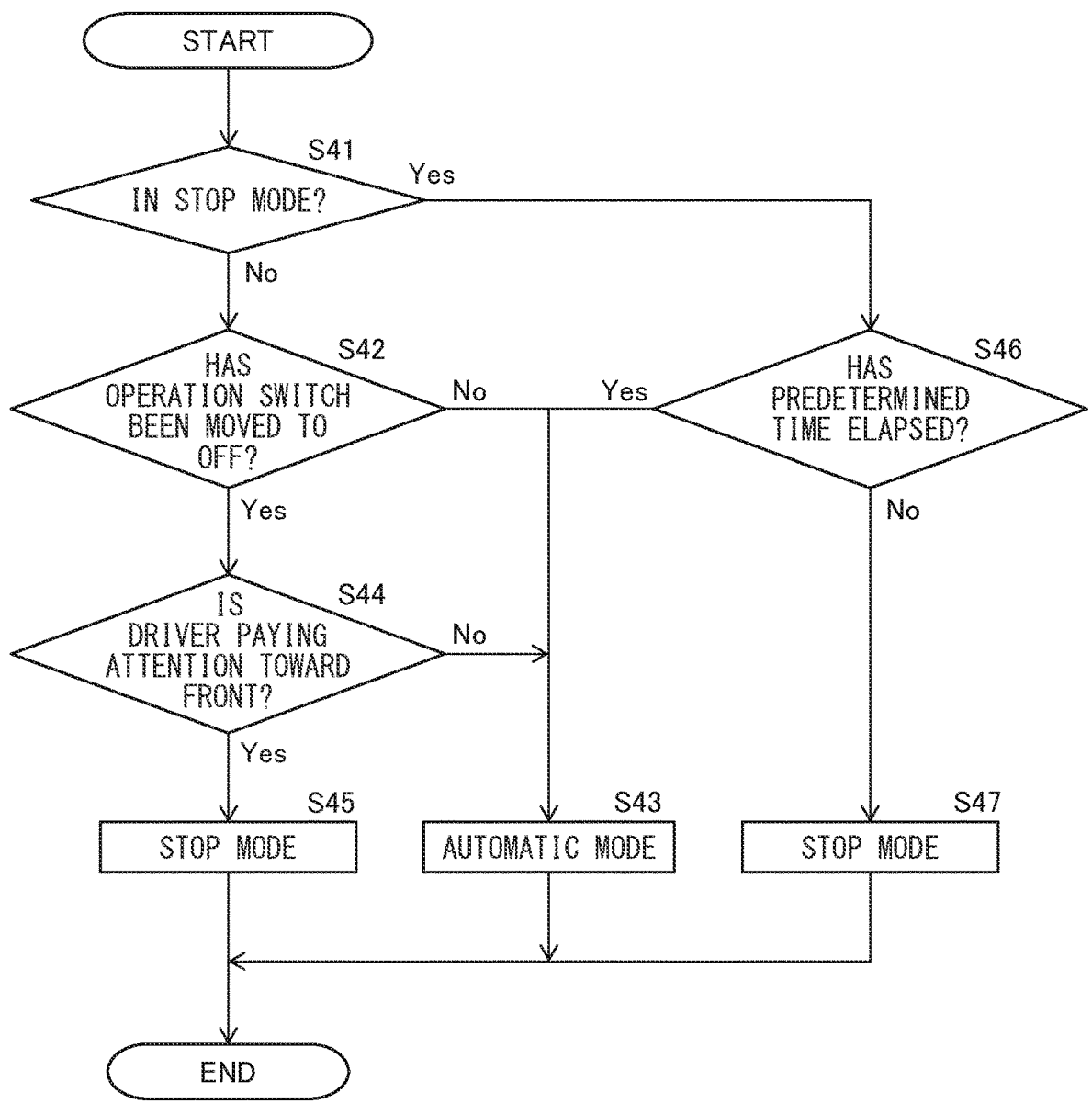
FIG. 8 is a flowchart of an operation mode setting process during autonomous driving executed by the controller according to a third embodiment.

FIG. 8 is a flowchart of an operation mode setting process during autonomous driving executed by the controller according to a third embodiment. The operation mode setting process during the autonomous driving of FIG. 8 is executed in step S13 of FIG. 5. Since steps S41 to S43 of FIG. 8 correspond to steps S21 to S23 of FIG. 6, respectively, and steps S45 to S47 correspond to steps S24 to S26 of FIG. 6, respectively, descriptions thereof have been omitted.

If it is determined in step S42 that the operation switch 17 has been moved to the OFF position (step S42—Yes), the processor 33 determines whether or not the driver is paying attention toward the front of the vehicle 100 (step S44). If it is determined in step S44 that the driver is not paying attention toward the front of the vehicle 100 (step S44—No), the processor 33 sets the operation mode of the electrical device to the automatic mode. Conversely, if it is determined in step S44 that the driver is paying attention toward the front of the vehicle 100 (step S44—Yes), the processor 33 sets the operation mode of the electrical device to the stop mode.

Fourth Embodiment

Next, an electrical device controller according to a fourth embodiment will be described with reference to FIGS. 9 and 10. The differences from the electrical device controller according to the first embodiment will be mainly described below.

In the present embodiment, even if the operation mode specified by the operation switch 17 is switched to the stop mode while the vehicle 100 is in the autonomous driving state, the processor 33 does not necessarily switch the operation mode of the electrical device to the stop mode. Specifically, after the operation mode specified by the operation switch 17 is switched to the stop mode, the operation mode of the electrical device is set to the stop mode only when an approval operation for switching the operation mode has been performed on the HMI 14. Therefore, even if the operation mode specified by the operation switch 17 is switched to the stop mode, if the approval operation is not performed, the operation mode of the electrical device is kept in the automatic mode.

Specifically, when the operation mode specified by the operation switch 17 is switched to the stop mode in a state in which the vehicle 100 is autonomously driven, the processor 33 first transmits a signal representing an approval request to the driver, to the HMI 14. Upon receiving the signal, the HMI 14 notifies the driver of an approval request for stopping the electrical device. More specifically, the HMI 14 displays such an approval request on, for example, the liquid crystal display and notifies the driver of such an approval request through a speaker.

When the driver performs an operation for approving the stop of the electrical device in the HMI 14 as a result of the notification to the driver, the HMI 14 transmits a signal indicating that the approval operation has been performed, to the BODY-ECU 19. Approval operations by the driver include the driver pressing an approval button on the touch panel of the HMI 14, the driver pressing a switch or button, and the like. When the BODY-ECU 19 receives such a signal, the processor 33 of the BODY-ECU 19 switches the operation mode of the electrical device to the stop mode.

On the other hand, when the driver does not perform the operation for approving the stop of the electrical device in the HMI 14 as a result of the notification to the driver, the BODY-ECU 19 does not receive a signal indicating that the approval operation has been performed. As a result, the processor 33 of the BODY-ECU 19 keeps the operation mode of the electrical device in the automatic mode.

Figure 9:
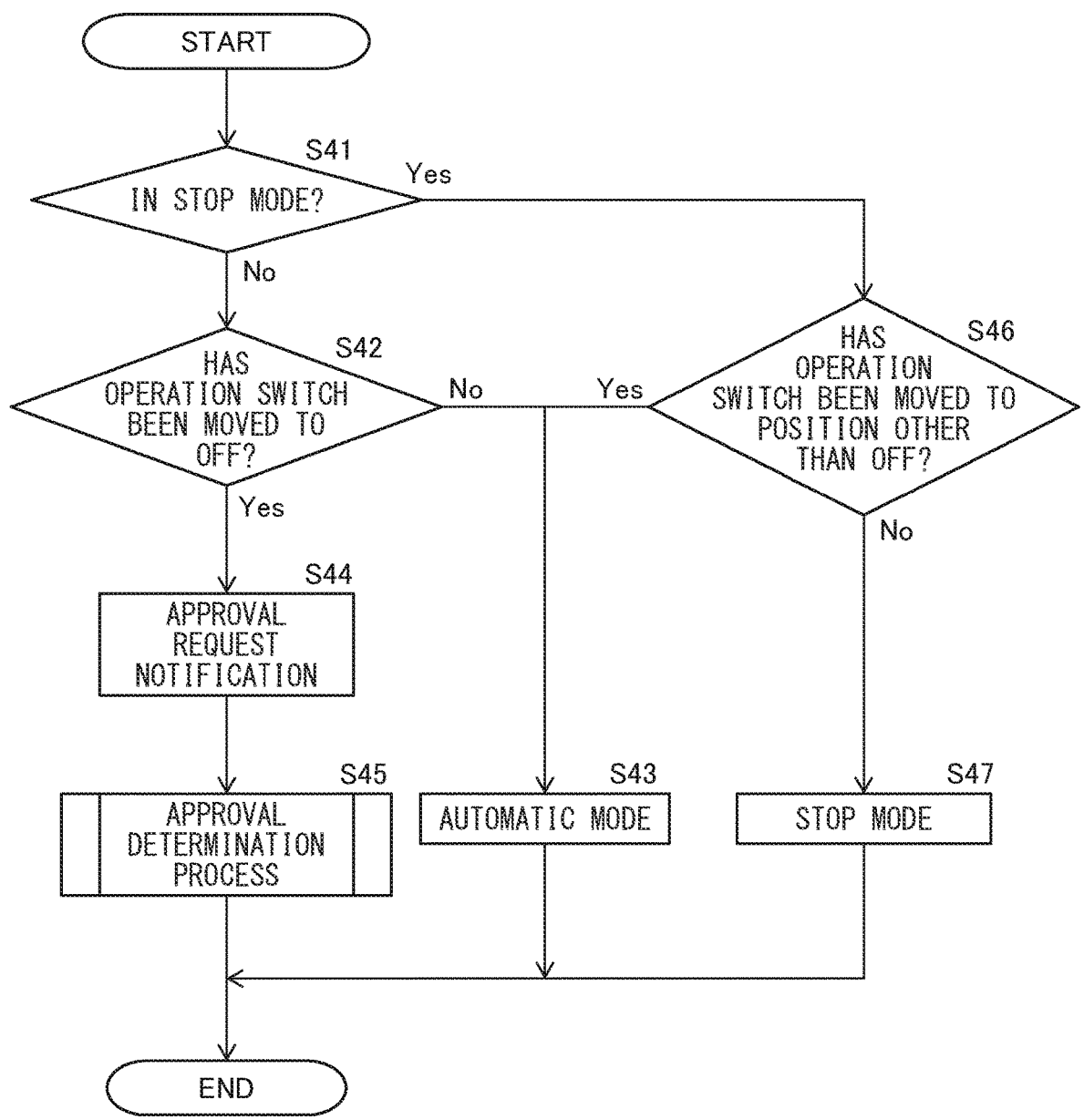
FIG. 9 is a flowchart of an operation mode setting process during autonomous driving executed by the controller according to a fourth embodiment.

FIG. 9 is a flowchart of an operation mode setting process during autonomous driving executed by the controller according to the fourth embodiment. The operation mode setting process during the autonomous driving of FIG. 9 is executed in step S13 of FIG. 5. Since steps S41 to S43 and S47 of FIG. 9 correspond to steps S21 to S23 and S26 of FIG. 6, respectively, descriptions thereof have been omitted.

If it is determined in step S42 that the operation switch 17 has been moved to the OFF position (step S42—Yes), the processor 33 notifies the driver of an approval request for stopping the electrical device from the HMI 14 (step S44). Thereafter, the processor 33 starts an approval determination process (step S45). When the approval determination process is started, in step S15 of FIG. 5, the approval determination process shown in FIG. 10 is executed, instead of the operation mode setting process shown in FIG. 9.

Figure 10:
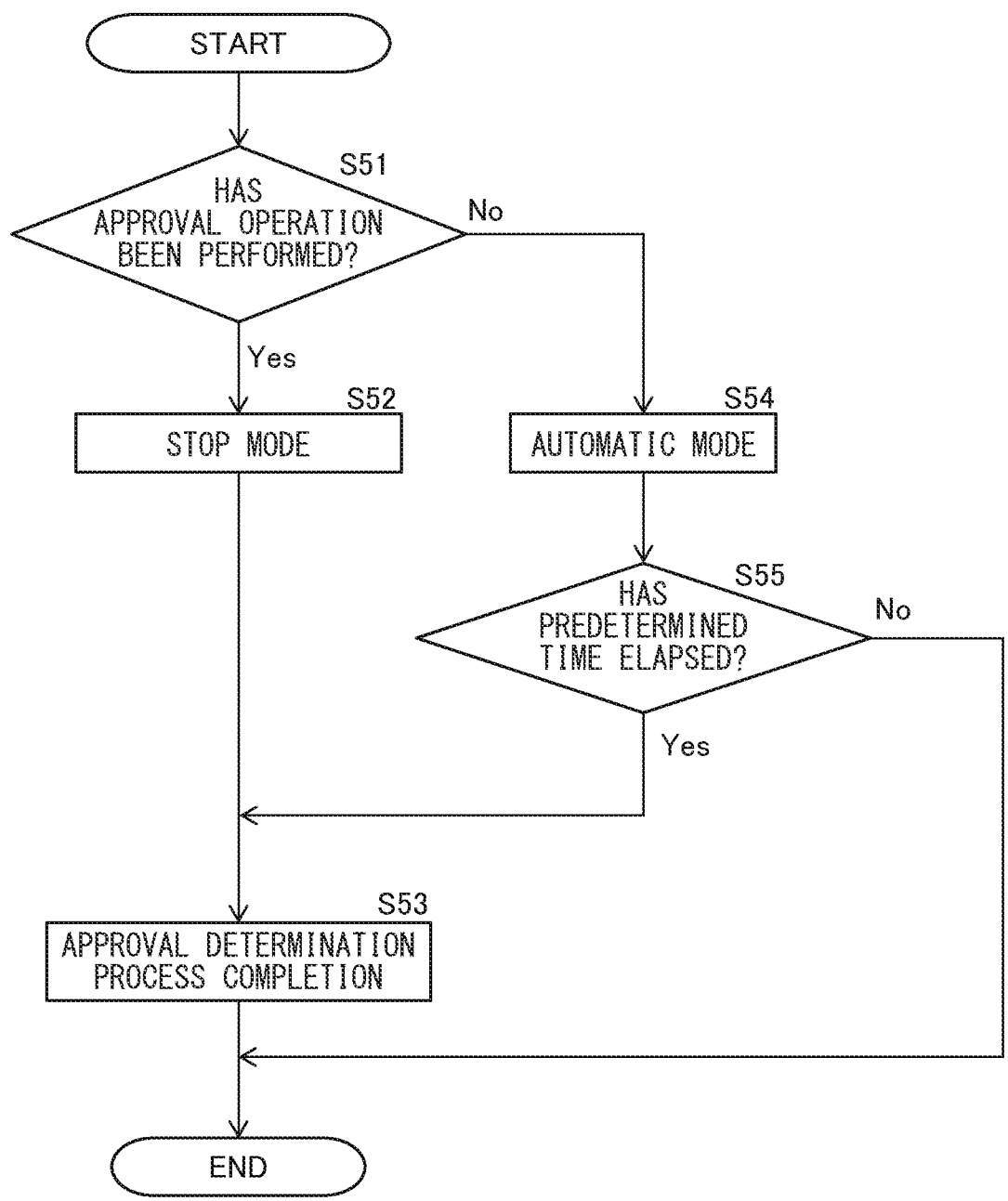
FIG. 10 is a flowchart showing an approval determination process.

FIG. 10 is a flowchart of the approval determination process. The approval determination process of FIG. 10 is executed in step S15 of FIG. 5, after the approval determination process is started in step S45 of FIG. 9.

As shown in FIG. 10, the processor 33 first determines whether an approval operation has been performed in the HMI 14 functioning as an input device (step S51). If it is determined in step S51 that an approval operation has been performed (step S51—Yes), the processor 33 switches the operation mode of the electrical device to the stop mode (step S52). Thereafter, the processor 33 ends the approval determination process. After the approval determination process is completed, in the next operation mode setting process, the operation mode setting process during autonomous driving shown in FIG. 9 is executed in step S15 of FIG. 5.

If it is determined in step S51 that no approval operation has been performed (step S51—No), the processor 33 keeps the operation mode of the electrical device in the automatic mode (step S54). Then, the processor 33 determines whether or not a predetermined time (e.g., a few seconds) has elapsed from the start of the approval determination process (step S55). If it is determined in step S55 that the predetermined time has not elapsed (step S55—No), the processor 33 does not end the approval determination process. On the other hand, if it is determined in step S55 that a predetermined time has elapsed (step S55—Yes), the processor 33 ends the approval determination process (step S53).

According to the controller according to the present embodiment, unless an approval operation is performed, even if the operation switch 17 is moved to the OFF position, the operation mode of the electronic device is not switched to the stop mode. Therefore, when the driver erroneously operates the operation switch 17, the operation mode of the electronic device is prevented from being switched.

Fifth Embodiment

Next, an electrical device controller according to a fifth embodiment will be described. The differences from the electrical device controller according to the first embodiment will be mainly described below.

In the present embodiment, the headlights 21 are configured to be able to switch light distribution direction in two stages (up and down). The operation switch 17 includes a light distribution direction operation switch (not shown) for operating a light distribution direction of the headlights 21. The light distribution direction operation switch may be provided with the light operation switch 17a or on the instrument panel.

The light distribution direction operation switch is provided, as switch positions, with an AUTO position, and an OFF position. The AUTO position is a switch position for specifying, as the operation mode, an automatic mode in which the light distribution direction of the headlights 21 is automatically controlled. The OFF position is a switch position for specifying, as the operation mode, a stop mode in which the change of the light distribution direction of the headlights 21 is stopped. When the light distribution direction operation switch is set to the OFF position, if the light operation switch 17a is in a state pulled toward a driver, the light distribution direction of the headlights 21 is set in a downward direction. Conversely, if the light operation switch 17a is in a state pushed away from a driver, the light distribution direction of the headlights is set in an upward direction.

When the light distribution control of the headlights 21 is the automatic mode, the processor 33 automatically changes the light distribution direction of the headlights 21, in accordance with the ambient illuminance of the vehicle 100 measured by the illuminance sensor 16a, positions of other vehicles around the vehicle 100, and the like, i.e., in accordance with an environment around the vehicle 100. The processor 33 detects the positions of other vehicles around the vehicle 100, by recognizing the other vehicles captured on the images output from the vehicle exterior camera 11. Specifically, if the processor 33 recognizes other driving vehicles in front of the vehicle 100, the processor 33 sets the light distribution direction of the headlights 21 in the downward direction. Further, if the processor 33 does not recognize other driving vehicles in front of the vehicle 100, the processor 33 sets the light distribution direction of the headlights 21 in the upward direction.

The processor 33 of the BODY-ECU 19 changes the light distribution direction of the headlights 21 in accordance with the driving state of the vehicle 100, similarly to the controller according to the above first to fourth embodiments. Therefore, when the vehicle 100 is manually driven, the light distribution direction is controlled in the operation mode specified by the light distribution direction operation switch.

On the other hand, when the vehicle 100 is automatically driven, the processor 33 basically controls the light distribution direction of the headlight in the automatic mode, regardless of the operation mode specified by the operation switch 17. However, similarly to the controller according to the above first to fourth embodiments, the processor 33 may temporarily set the operation mode of the light distribution direction of the headlights 21, when the operation mode specified by the light distribution direction operation switch is switched to the stop mode from an operation mode other than the stop mode.

While the preferred embodiments of the present invention have been described above, the present invention is not limited to these embodiments, and various modifications and changes can be made within the scope of the claims.

The invention claimed is:

1. An electrical device controller for controlling an electrical device including either a headlight or a wiper used in a vehicle which is capable of switching a driving state between autonomous driving and manual driving, the controller comprising:
   an operation member configured to be operated by an occupant with at least three different and independent positions that cannot be selected simultaneously, which include: (i) stop position, (ii) automatic position, and (iii) at least one manual position that is not the stop position or the automatic position;
   a processor, and a memory for storing a program executed by the processor, wherein the processor is configured to:
   check if the driving state of the vehicle is in the autonomous driving or manual driving;
   control the electrical device in a plurality of different and independent operation modes that cannot be selected simultaneously, the plurality of operation modes including an automatic mode for automatically changing an operation state of the electrical device, the processor operating the electrical device in the automatic mode when the operation member is in the automatic position and the processor has determined that the driving state is manual driving, control the electrical device in a stop mode to stop the electrical device, the processor operating the electrical device in the stop mode when the operation member is moved to the stop position and the processor has determined that the driving state is manual driving, control the electrical device in a manual operation mode, the processor operating the electrical device in the manual operation mode when the operation member is in the manual position and the processor has determined that the driving state is manual driving, control the electrical device in the automatic mode, the processor operating the electrical device in the automatic mode regardless of the position of the operation member, and the driving state is autonomous driving, and controlling the electrical device using the processor in the stop mode at least on a temporary basis when the operation member is switched to the stop position from a position other than the stop position, and the processor has determined that the driving state is autonomous driving.

2. The electrical device controller according to claim 1, wherein the processor is configured to set the operation mode of the electrical device to the stop mode for a fixed predetermined interval, when the operation mode specified with the operation member is switched to the stop position from a position other than the stop position, in a state in which the vehicle is autonomously driven, and thereafter, set the operation mode of the electrical device to the automatic mode.

3. The electrical device controller according to claim 1, wherein the processor is configured to set the operation mode of the electrical device to the stop mode until it is determined that there is an abnormality in an image of a camera capturing an area in front of the vehicle, when the operation mode specified by the operation member is switched to the stop position from a position other than the stop position, in a state in which the vehicle is autonomously driven, and thereafter, set the operation mode of the electrical device to the automatic mode.

4. The electrical device controller according to claim 1, wherein the processor is configured to set the operation mode of the electrical device to the automatic mode without temporarily setting the stop mode, even when the operation mode specified with the operation member is switched to the stop position from a position other than the stop position in a state in which the vehicle is autonomously driven, in the case in which it is determined that a driver is not paying attention to an area in front of the vehicle, based on an output of a driver monitor which monitors a state of the driver.

5. The electrical device controller according to claim 1, wherein the processor is configured to control the electrical device in the stop mode at least on a temporary basis when the operation mode specified with the operation member is switched to the stop position from a position other than the stop position in a state in which the vehicle is autonomously driven, only in the case in which an operation for approving switching of the operation mode was performed in an input device different from the operation member after switching of the operation mode with the operation member.

6. The electrical device controller according to claim 1, wherein the electrical device is the wiper, and
the processor is configured to automatically change an operation state of the wiper depending on an amount of rain in the automatic mode, and to stop the wiper in the stop mode.

7. The electrical device controller according to claim 1, wherein the electrical device is a headlight, and
the processor is configured to automatically change an operation state of the headlight depending on luminance outside the vehicle in the automatic mode, and to turn off the headlight in the stop mode.

8. The electrical device controller according to claim 1, wherein the electrical device is a headlight,
the processor is configured to automatically change a light distribution direction of the headlight depending on an environment around the vehicle in the automatic mode, and stop the change of the light distribution direction in the stop mode.

\* \* \* \* \*